United States Patent
Bryson et al.

(10) Patent No.: US 9,825,468 B1
(45) Date of Patent: Nov. 21, 2017

(54) METHODS AND APPARATUS FOR AN AUTOMATIC INPUT SELECTING POWER PATH SWITCH

(71) Applicant: GLF Integrated Power, Inc., Santa Clara, CA (US)

(72) Inventors: Stephen W. Bryson, Cupertino, CA (US); Ni Sun, Sunnyvale, CA (US)

(73) Assignee: GLF Integrated Power, Inc., Santa Clara, CA (US)

( * ) Notice: Subject to any disclaimer, the term of this patent is extended or adjusted under 35 U.S.C. 154(b) by 508 days.

(21) Appl. No.: 14/586,586

(22) Filed: Dec. 30, 2014

(51) Int. Cl.
H02H 3/24 (2006.01)
H02J 4/00 (2006.01)
H02H 3/00 (2006.01)

(52) U.S. Cl.
CPC .............. H02J 4/00 (2013.01); H02H 3/00 (2013.01)

(58) Field of Classification Search
USPC .......................................................... 361/92
See application file for complete search history.

(56) References Cited

U.S. PATENT DOCUMENTS

| | | | | |
|---|---|---|---|---|
| 6,051,995 A * | 4/2000 | Pollachek | ............ | H03K 17/164 326/27 |
| 8,824,255 B2 * | 9/2014 | Nagasato | ................ | H02M 1/32 369/30.21 |
| 9,559,512 B1 * | 1/2017 | Bryson | ..................... | H02H 3/08 |
| 9,647,657 B1 * | 5/2017 | Bryson | ................ | H03K 17/161 |
| 2002/0130646 A1 * | 9/2002 | Zadeh | ..................... | G05F 1/575 323/275 |
| 2007/0296386 A1 * | 12/2007 | Umeki | .................... | H02M 1/36 323/284 |
| 2008/0088997 A1 * | 4/2008 | So | .......................... | H02H 9/025 361/93.7 |
| 2012/0161828 A1 * | 6/2012 | Cho | .......................... | H03L 1/00 327/155 |
| 2013/0154592 A1 * | 6/2013 | Teh | .......................... | G05F 1/56 323/273 |
| 2013/0314830 A1 * | 11/2013 | Zamprogno | .......... | H02H 3/207 361/86 |
| 2015/0229153 A1 * | 8/2015 | Kung | .................... | H02J 7/0072 320/162 |
| 2016/0308372 A1 * | 10/2016 | Kolla | ........................ | H02J 4/00 |

* cited by examiner

Primary Examiner — Ronald W Leja
(74) Attorney, Agent, or Firm — Pillsbury Winthrop Shaw Pittman LLP

(57) ABSTRACT

A fully integrated circuit configuration that can be used to control the power path of a number of PMOS load switches is described. The circuit has a unique feature that it can automatically select the input voltage to be presented to the VOUT pin based upon the voltage levels at the respective VIN pins. By using combinations of the EN input pin and the SEL input pin, the circuit can be configured to perform one of four functional behaviors: 1. Complete shutdown (both switches in the OFF position), 2. Automatic input selection according the voltage levels that are presented on the VIN pins, 3. Selection of the VIN1 input only, or 4. Selection of the VIN2 input only. This concept is extended to multiple input sources in further embodiments.

10 Claims, 6 Drawing Sheets

Selection Table

| SEL | EN | UVLO | VCC | FUNCTION |
|---|---|---|---|---|
| 0 | 0 | N/A | N/A | Both Switches Off/Shut Down |
| 0 | 1 | VIN1, VIN2 < UVLO | N/A | No Output |
| 0 | 1 | VIN1 > UVLO; VIN2 <UVLO | VIN1 | VIN1 to VOUT |
| 0 | 1 | VIN2 >UVLO; VIN1 <UVLO | VIN2 | VIN2 to VOUT |
| 0 | 1 | VIN1&VIN2>UVLO | Highest V | Auto Switch to Highest Input Voltage |
| 1 | 0 | VIN2>UVLO | VIN2 | VIN2 Only |
| 1 | 1 | VIN1 >UVLO | VIN1 | VIN1 Only |

METHODS AND APPARATUS FOR AN AUTOMATIC INPUT SELECTING POWER PATH SWITCH

BACKGROUND

Field of the Art

Described is an integrated circuit that has power control functionality and, in particular, power path selection based upon various input settings.

Background

As modern portable systems become more flexible and sophisticated, there has become a need to be able to utilize all of the available options that can be used to keep the mobile device either charged or powered up. These charging options can be from things such as a wall charger (the most common) or a wireless charging system or a USB compatible input port. But more recently there has emerged a further need for powering certain sections of the mobile device by using near field communications (NFC). In these applications the power for the receiving mobile device may be derived from the proximity to the NFC transmitting device. In all of these applications there is a need to be able switch between different power input sources to be able to provide power to the mobile device.

Power multiplexers have been used in other applications such as switching between a normal VCC voltage and a high voltage (HV) input in order to either read or write from a programmable logic device or an EEPROM device. However most of these applications require the user to select from one input or the other by way of a separate select pin. Recently, products have been introduced that will select one of two inputs as long as one of the inputs is above the UVLO (under voltage lockout) threshold and the other is not. If both inputs exceed the UVLO threshold, then the user must again use a separate select input pin to tell the device which input has priority to be connected to the output.

SUMMARY

In the simplest embodiment described herein, the device may be either controlled by the conventional methods, manually selecting which of two input voltages should be connected to the output, or alternately, the device may be set into a mode in which it will automatically select the input voltage which is at the highest voltage potential when compared to the other input voltage and connect that input voltage to the output. This technique allows the power multiplexer to have some intelligence built into it and reduces the burden of control from the user or processor.

In the case of the NFC application, the mobile device may be in a deep sleep mode to save power; however, the NFC communication device would be able to access some part of the mobile device such as the SIM card by the system being able to automatically detect the NFC device energy and switch to its power input to complete the transaction.

In a further embodiment, multiple inputs are added to be multiplexed and the control table is expanded appropriately to cover these extra input cases.

Further embodiments of the present invention can be imagined in the context of additional features such as OVP (over voltage protection), OCP (over current protection), and thermal shut down.

DESCRIPTION OF THE PREFERRED EMBODIMENT

The simplest embodiment described herein is an integrated circuit chip that includes two power PMOS load switches that are connected together on the VOUT side of the integrated circuit chip device while having separate input voltage sources VIN1 and VIN2. Each of the power PMOS load switches also has a sub-circuit that allows the bulk node of the power PMOS load switches to be connected to the highest voltage potential either at its source or at its drain and in this way becomes a reverse current blocking ("RCB") switch. This is necessary to block any reverse current than would otherwise flow back to the VIN pin when the VOUT voltage becomes greater than its VIN voltage. The control of the system is derived from the VCC input selection block which selects the highest input voltage from VIN1 or VIN2 and uses that voltage to power the remaining circuits in the integrated circuit chip. The output of the VCC block in conjunction with the two external input signals SEL and EN form the basis of the control table shown in FIG. 2, which control table is derived from the state of these external signals, as is apparent. By appropriately configuring the EN input pin and the SEL input pin, the integrated circuit chip can be set into the auto-input detection mode or be used in the manual selection mode. Keeping both the EN input and the SEL input at a LOW level will cause the integrated circuit chip to be shut down and both inputs to be disconnected from VOUT. Also in this mode an optional pull-down resistor can be used to insure that the output voltage is completely pulled down to ground.

In the automatic switching mode, the SEL input is set to a logic level LOW voltage and the EN input is set to a logic level HIGH voltage. This allows the system to automatically select the highest input voltage from either VIN1 or VIN2 to be connected to the VOUT pin based upon the slew rate control block state, as discussed herein. If it is the users option to select the manual mode of operation, then the SEL pin is set to a logic level HIGH voltage and the EN pin is used by the slew rate control block to select between connecting VIN1 or VIN2 to VOUT.

In addition, the embodiments described, once the particular power signal that is selected is determined, perform skew rate control on the particular power signal that is selected, preferably as described in applications previously filed, such as, for example, Apparatus and Methods for Slew Rate Controlled Load Switches, U.S. patent application Ser. No. 14/469,258 filed Aug. 26, 2014, which is expressly incorporated by reference herein.

Figures 1, 2:
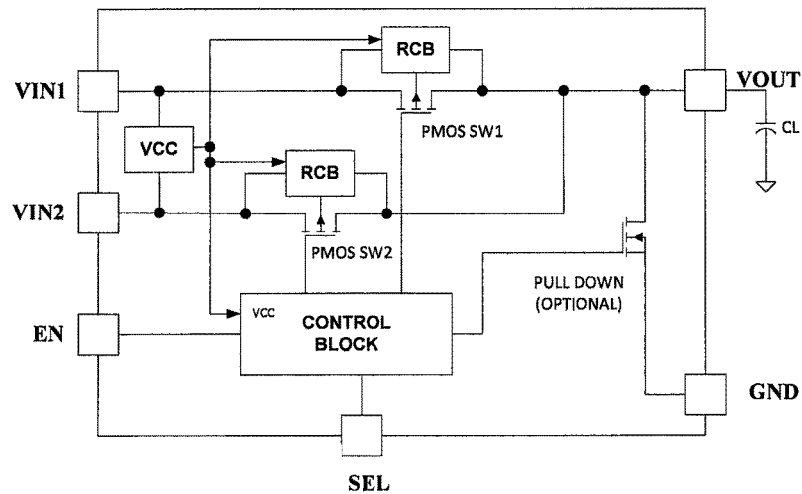
FIG. 1 is an overall block diagram of the power multiplexer with the automatic input switching feature.
FIG. 2 shows the selection table for the EN and SEL input pins.
Figure 3:
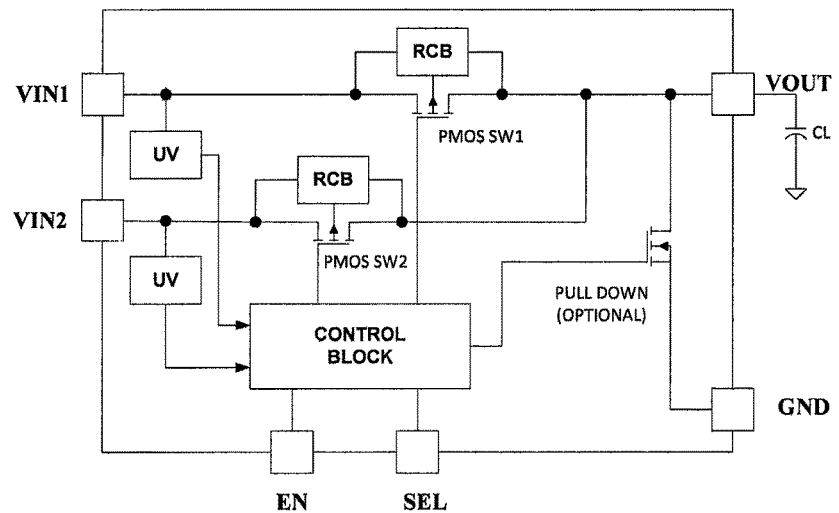
FIG. 3 shows an embodiment of the power mux with UVLO control (prior art).

Referring to the figures and drawings in detail, FIG. 1 shows the overall system block diagram of the power multiplexer which includes a pair of power PMOS load switches that are equal in size (SW1 and SW2), a VCC input selection block, a slew rate control block that takes inputs from the VCC block as well as from two external inputs, SEL and EN in order to control the behavior of the two PMOS load switches as discussed hereinafter, and the optional pull-down resister control circuit. Each of the power PMOS load switches has associated with it a block labeled RCB which controls the behavior of the PMOS transistor's bulk node in order to perform reverse current blocking. The power PMOS load switches, SW1 and SW2, are connected internally as a multiplexer, that is to say, there are two inputs labeled VIN1 and VIN2 and only one output labeled VOUT. The behavior of the multiplexer system is governed by the slew rate control block according to the table shown in FIG. 2, the slew rate control block being logic circuitry that is set based upon the state of the various inputs to create the outputs as described in the table shown in FIG. 2 and further described herein.

For the first case, input signals EN and SEL are both set to a logic LOW level. This causes both SW1 and SW2 to be in the open state and disconnects both VIN1 and VIN2 from the output pin VOUT. For the second case of FIG. 2, the EN input pin is changed to a logic level HIGH state which enables the chip into the automatic input selection mode. In this mode, the control of the voltage at the VOUT pin is controlled by the SEL block which is connected in between the VIN1 and VIN2 input pins.

Figure 5:
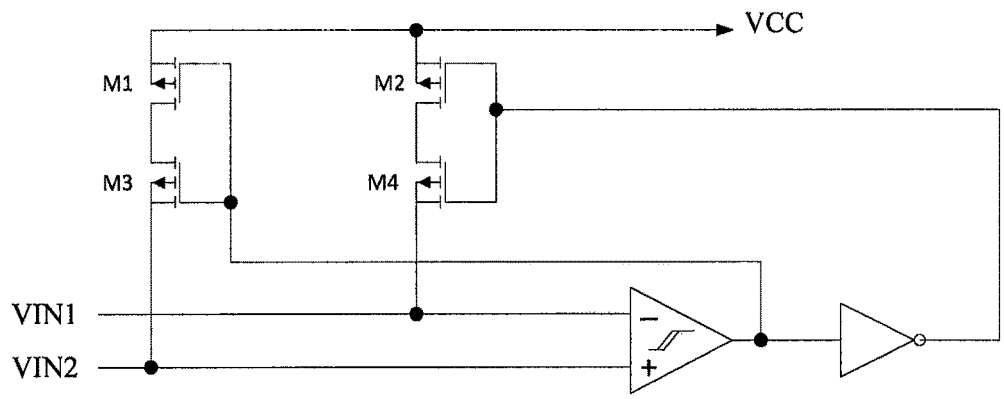
FIG. 5 shows the sub-circuit that allows the chip supply VCC to be switched between VIN1 and VIN2.

The simplified schematic diagram of the VCC selection block is shown in FIG. 5. Referring now to FIG. 5, the VCC selection block is used to determine which of the two input channels has the highest voltage potential. The block itself consists of a pair of PMOS switches and a comparator circuit. The comparator measures the difference between the VIN1 pin and the VIN2 pin and then selects the highest voltage on those input pins to be connected to the chip's VCC supply voltage. It also sends a control signal to the slew rate control block telling the slew rate control block whether to select PMOS load switch SW1 or SW2 to be connected to VOUT.

Figure 4:
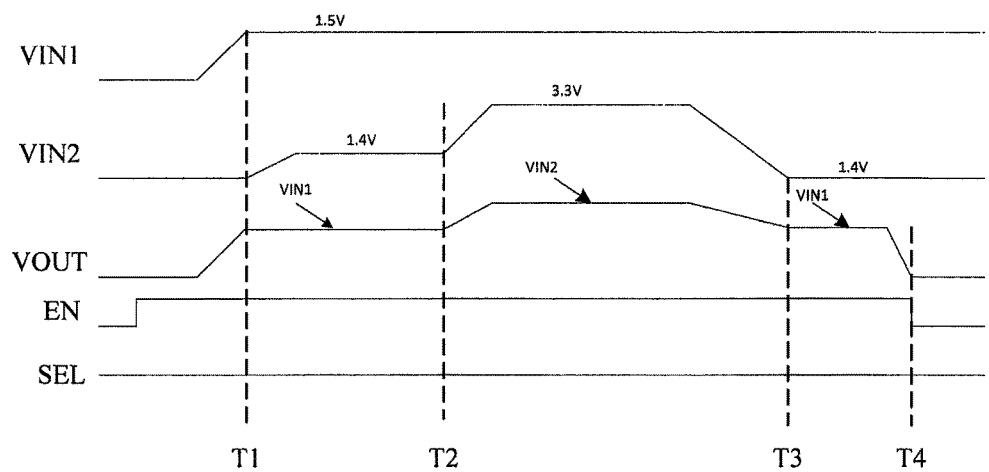
FIG. 4 shows the timing diagram for the auto-switching sequence.

The operation of the automatic input selection is described in the diagram of FIG. 4. With the EN input pin set to a logic level HIGH and the SEL input pin set to a logic level LOW, the VIN1 and VIN2 pins are allowed to power on. Since VIN1 rises above the UVLO threshold first, the VOUT pin is selected to be connected to VIN1 through load switch SW1 at time T1. Then the VIN2 voltage begins to rise. As VIN2 becomes greater than VIN1 the slew rate control block detects this change and switches the input voltage from VIN1 to VIN2 at time T2 and the VOUT pin now follows the VIN2 input. When the input voltage on VIN2 is lowered, VOUT is again switched back to VIN1 when the slew rate control block detects that VIN1 is now a higher potential that VIN2 at time T3. When the EN input pin is brought to a logic level LOW voltage, then both load switches are disconnected from their respective input voltages and the voltage at the VOUT pin is discharged to zero volts by the pull-down resistor.

Figure 6:
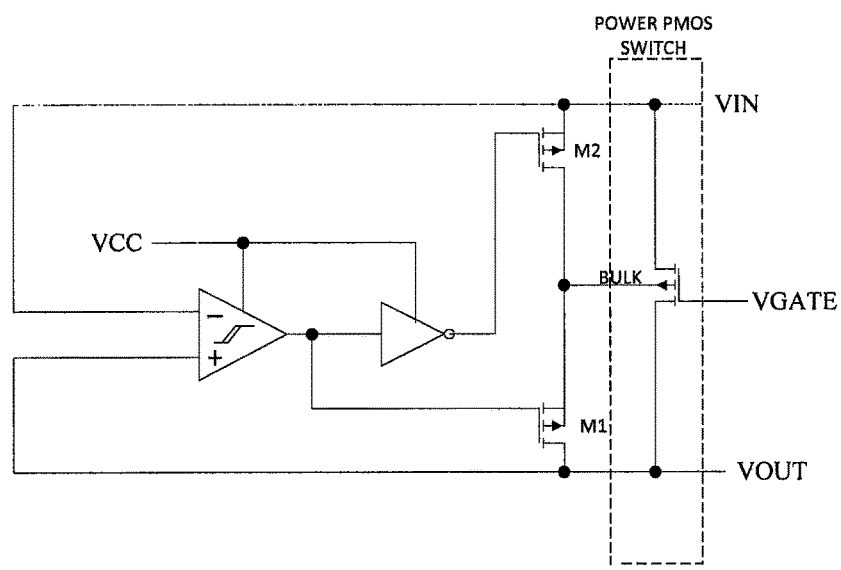
FIG. 6 shows the sub system that allows the power PMOS switch to be able to switch the bulk node between its input and output thereby avoiding any reverse current flow known as RCB (reverse current blocking).

Since it is not desirable to have any current flowing from VIN1 back into VIN2 or vise-versa, the power PMOS load switches are designed with reverse current blocking ("RCB") circuitry. FIG. 6 describes the RCB functioning. In FIG. 6 the power PMOS load switch is configured with a floating bulk terminal. Using a voltage comparator connected across the source and drain terminals, the bulk diode is switched according to which terminal of the power PMOS switch is at the highest voltage potential thereby allowing the bulk diode to block any reverse current that might be forced to flow between the source and drain terminals. Both power PMOS load switches SW1 and SW2 are connected to an RCB circuit.

Figure 7:
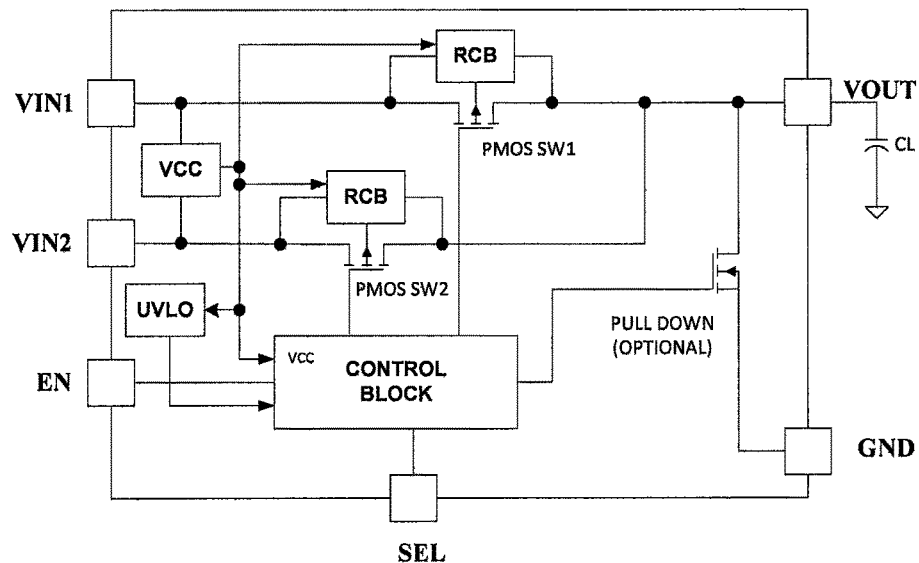
FIG. 7 is a further embodiment of the present invention which includes an under voltage lock out function (UVLO).
Figure 8:
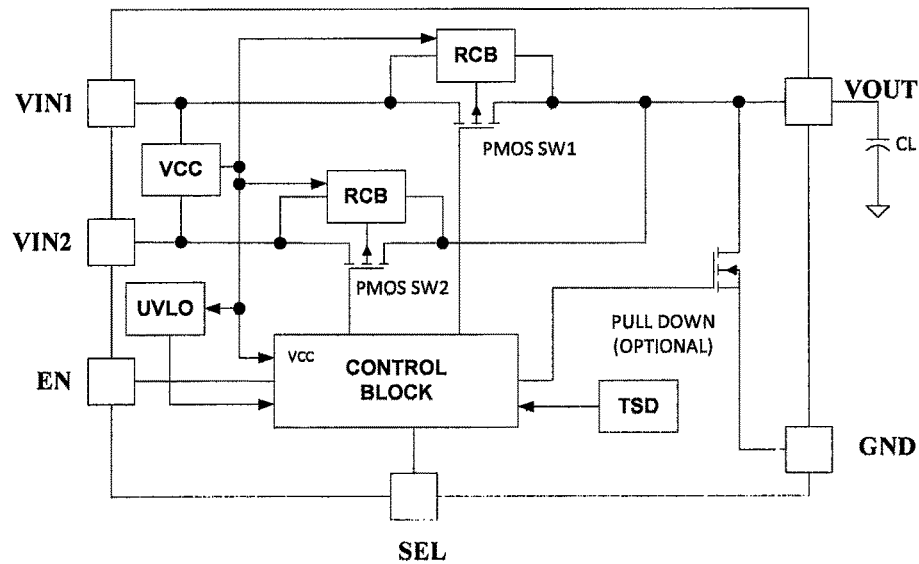
FIG. 8 shows a further embodiment of the present invention which includes a thermal shutdown block (TSD).

In a further embodiment, FIG. 7 shows the inclusion of a UVLO function on the same integrated circuit chip that prevents the part from operating at voltages that are below the recommended operating conditions. The circuitry will operate properly as long as one of the two inputs is above the UVLO threshold level.

Furthermore, an additional protection feature can be added to provide thermal protection from either power path through SW1 or SW2 to the output pin by means of detecting the die temperature which might be an indication of an overcurrent condition at the output pin of the device. In this case, a TSD circuit on the same integrated circuit chip would be energized if the die temperature exceeds 150° C. and cause the control block to open up both power path switches in order to disconnect the output load from both VIN1 and VIN2. The TSD circuit has a thermal hysteresis which would allow the power path switches to try to reconnect to the output should the die temperature fall below 125° C.

Figure 9:
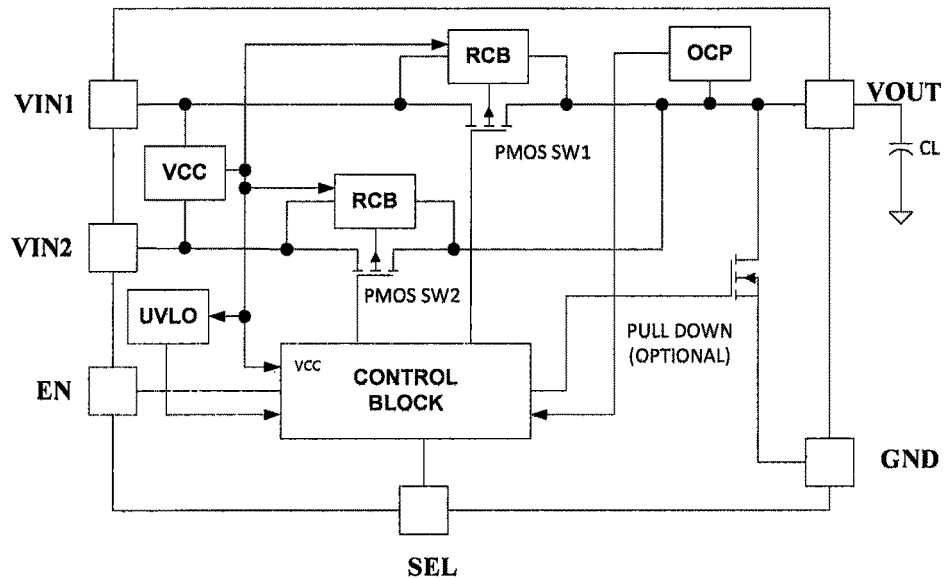
FIG. 9 shows an alternate methodology of protecting the power path load switch by integrating an over current protection (OCP) monitor at the output.
Figure 10:
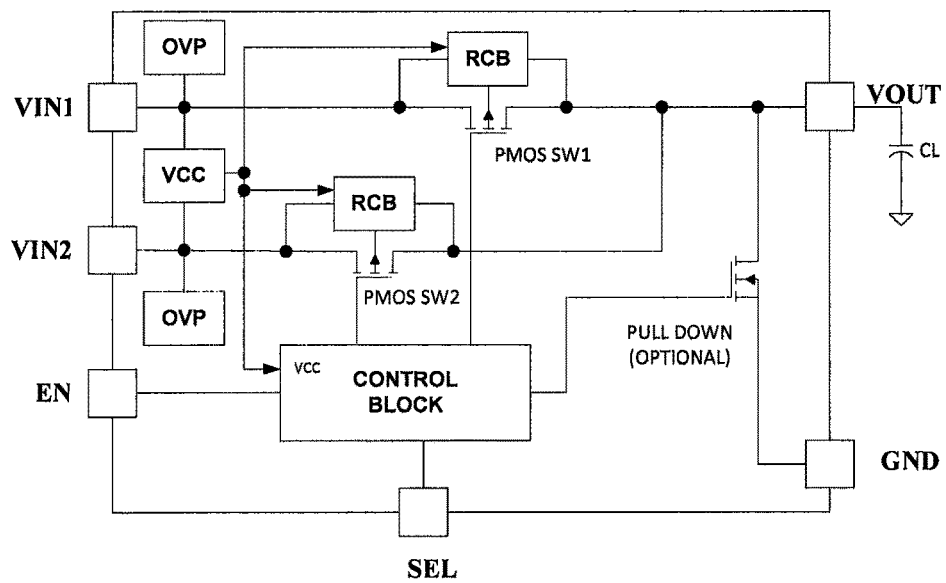
FIG. 10 shows an alternative embodiment for protection of the input voltage using over voltage protection (OVP).
Figure 11:
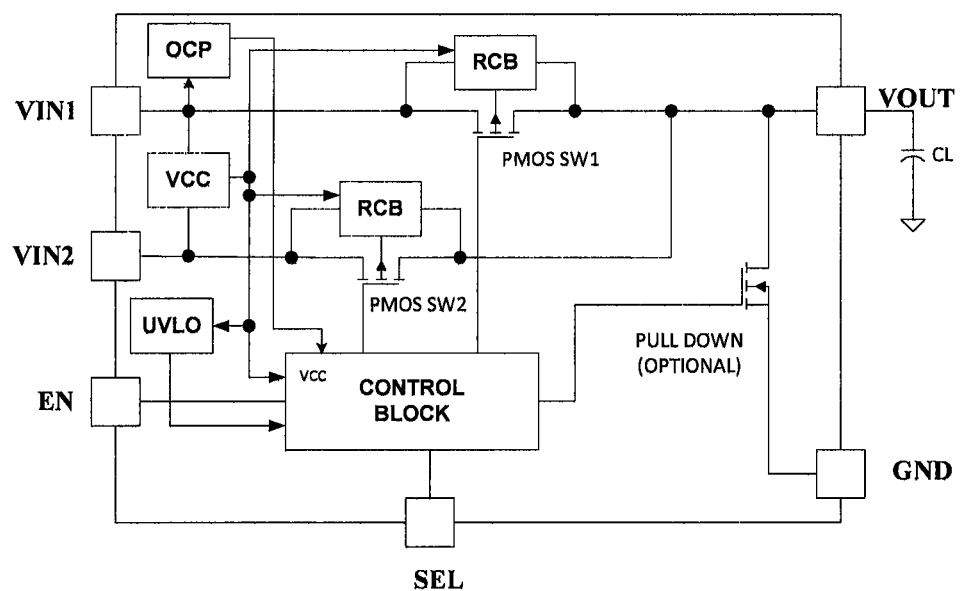
FIG. 11 shows an alternate methodology of protecting the power path load switch by integrating an over current protection (OCP) monitor at the input.

In an alternate scheme shown in FIGS. 9 and 11, an OCP circuit, on the same integrated circuit chip, is used to monitor the current of the active load switch (either SW1 or SW2 or both) and will act to cut back the current that is being delivered to the load at the output should the current exceed some predetermined limit level. FIG. 10 shows a further embodiment using an OVP block on the same integrated circuit chip to protect the input voltages.

Many further embodiments are possible using various combinations of voltage protection (OVP) and current protection (OCP) schemes on either the VIN1 channel or the VIN2 channel or both at the same time.

Although described herein with reference to the preferred embodiment, one skilled in the art will readily appreciate that other applications may be substituted for those set forth herein without departing from the intended spirit and scope.

Various unique aspects have been described in terms of particular embodiments. Other embodiments are within the scope of the following claims. For example, the steps can be performed in a different order and still achieve desirable results, and various sub-blocks described can be used in different combinations.

What is claimed is:

1. A switching circuit connectable between an input source voltage obtained from a first voltage and a second voltage that is not the same as the first voltage and an output load for controlling an inrush current to the output load upon turn-on, the switching circuit including:
   an integrated circuit, the integrated circuit including:
      a first voltage input for inputting the first voltage;
      a second voltage input for inputting the second voltage that is not the same as the first voltage;

a first power PMOS load switch including a first load switch gate, a first load switch source and a first load switch drain, the inrush current to the output load passing from the first load switch source to the first load switch drain and being controlled by a first load switch control voltage on the first load switch gate;

a second a second power PMOS load switch including a second load switch gate, a second load switch source and a second load switch drain, the inrush current to the output load passing from the second load switch source to the second load switch drain and being controlled by a second load switch control voltage on the second load switch gate;

a slew rate control circuit connected to the first load switch gate and the second load switch gate that provides the load switch control voltage to the first and second power PMOS load switches; and an input VCC selection module that selects between one of the first voltage input and the second voltage input automatically depending upon which has the highest voltage potential relative to the other input voltage, and provides an input control signal indicating the selection to the slew rate control circuit.

2. The switching circuit according to claim 1, which includes on the integrated circuit a reverse current blocking circuit (RCB) for each of the first and second power PMOS load switches, thereby preventing reverse currents from flowing between the two input voltages.

3. The switching circuit according to claim 2, which includes on the integrated circuit an under voltage lockout (UVLO) circuit that is used to monitor the input voltage.

4. The switching circuit according to claim 3, which includes on the integrated circuit a thermal shutdown circuit (TSD) that protects each of the first and second load switches from on chip die temperatures in excess of 150° C.

5. The switching circuit according to claim 4, which includes on the integrated circuit an over current protection (OCP) circuit that is used to monitor the current through the first PMOS load switch and the second PMOS load switch that is in an active state.

6. The switching circuit according to claim 5, which includes on the integrated circuit an over voltage protection (OVP) circuit that is used to monitor the current through the first PMOS load switch and the second PMOS load switch that is in an active state.

7. The switching circuit according to claim 1, which includes on the integrated circuit an under voltage lockout (UVLO) circuit that is used to monitor the input voltage.

8. The switching circuit according to claim 1, which includes on the integrated circuit a thermal shutdown circuit (TSD) that protects each of the first and second load switches from on chip die temperatures in excess of 150° C.

9. The switching circuit according to claim 1, which includes on the integrated circuit an over current protection (OCP) circuit that is used to monitor the current through the first PMOS load switch and the second PMOS load switch that is in an active state.

10. The switching circuit according to claim 1, which includes on the integrated circuit an over voltage protection (OVP) circuit that is used to monitor the current through the first PMOS load switch and the second PMOS load switch that is in an active state.

* * * * *